United States Patent
Vasekin et al.

(10) Patent No.: US 7,360,061 B2
(45) Date of Patent: Apr. 15, 2008

(54) PROGRAM INSTRUCTION DECOMPRESSION AND COMPRESSION TECHNIQUES

(75) Inventors: Vladimir Vasekin, Cambridge (GB); Andrew Christopher Rose, Cambridge (GB)

(73) Assignee: ARM Limited, Cambridge (GB)

( * ) Notice: Subject to any disclaimer, the term of this patent is extended or adjusted under 35 U.S.C. 154(b) by 186 days.

(21) Appl. No.: 11/004,227

(22) Filed: Dec. 6, 2004

(65) Prior Publication Data

US 2005/0278508 A1 Dec. 15, 2005

(30) Foreign Application Priority Data

Jun. 15, 2004 (GB) .................................. 0413347.6

(51) Int. Cl.
*G06F 9/30* (2006.01)

(52) U.S. Cl. ........................................ 712/210; 708/203

(58) Field of Classification Search ................ 712/210; 708/203

See application file for complete search history.

(56) References Cited

U.S. PATENT DOCUMENTS

| | | | |
|---|---|---|---|
| 5,057,837 A | * | 10/1991 | Colwell et al. ............... 341/55 |
| 5,870,576 A | | 2/1999 | Faraboschi et al. ......... 395/386 |
| 5,893,143 A | * | 4/1999 | Tanaka et al. ............... 711/120 |
| 5,930,508 A | | 7/1999 | Faraboschi et al. |
| 6,581,131 B2 | | 6/2003 | Vondran, Jr. ................... 711/3 |

\* cited by examiner

*Primary Examiner*—Alford Kindred
*Assistant Examiner*—Benjamin P. Geib
(74) *Attorney, Agent, or Firm*—Nixon & Vanderhye P.C.

(57) ABSTRACT

A data processing system including an instruction cache 8 and an instruction decompression circuit 10 between the instruction cache 8 and a compressed instruction data memory 12. The instruction decompression circuit decompresses compressed instruction data CID recovered from the compressed instruction data memory and forms program instructions which are supplied to the instruction cache. The program instructions are compressed in blocks of program instructions with an associated mask value where the bit values within the mask indicate whether corresponding bit slices within the blocks of program instructions are to be represented by a default bit value or a separately specified by bit slice specifier values. This technique is particularly well suited to VLIW processors.

18 Claims, 3 Drawing Sheets

$M_1, M_2, BS_0, BS_1, BS_2, BS_3, BS_4, BS_5, BS_6, BS_7$

8 * 16-bit instructions

PROGRAM INSTRUCTION DECOMPRESSION AND COMPRESSION TECHNIQUES

BACKGROUND OF THE INVENTION

1. Field of the Invention

This invention relates to data processing systems. More particularly, this invention relates to data processing systems including a decompression mechanism for forming program instructions from compressed instruction data.

There are several known data processing systems using compressed instruction data which is decompressed into program instructions prior to those program instructions being executed. One example of such a system is that of MIPS Corporation which uses compressed memory pages of program instruction words which are decompressed under operating system control using special purpose hardware when program instructions within those pages are first accessed. Such systems are advantageous in that they reduce the program instruction storage space requirements.

A disadvantage with program instruction compression techniques, such as that discussed above, are that they require the operating systems to control the required decompression and the data processing circuits using the program instructions can require modification to cope with the decompression requirements.

2. Description of the Prior Art

It is also known to provide instruction translation caches in which instructions stored in a main memory are translated into a different form which is then stored within a cache memory. Those cached translated instructions can then be executed by a processor core. Examples of such systems are the processors produced by Transmeta.

SUMMARY OF THE INVENTION

Viewed from one aspect the present invention provides apparatus for processing data, said apparatus comprising:

a data processing circuit operable in response to program instructions to perform data processing operations;

a cache memory coupled to said data processing circuit and operable to store said program instructions;

a compressed instruction data memory coupled to said cache memory; and an instruction decompression circuit disposed between said compressed instruction data memory and said cache memory and operable to receive compressed instruction data from said compressed instruction data memory, to decompress said compressed instruction data to form program instructions and to supply said program instructions to said cache memory, wherein said instruction decompression circuit is operable to form a plurality of said program instructions from a mask and a plurality of bit slice specifiers within said compressed instruction data, said mask having bit values specifying whether respective corresponding bit positions within each of said plurality of program instructions have a predetermined default bit value or have bit values specified by a corresponding bit slice specifier.

The present technique recognizes the advantages of providing instruction decompression hardware between a cache memory for storing program instructions and a compressed instruction data memory for storing compressed instruction data. Such instruction decompression hardware is able to decompress the compressed instruction data as required to service cache misses within the cache memory for program instructions in a manner which substantially isolates the data processing circuit itself from the need to manage or be modified to deal with the instruction decompression. Furthermore, the compressed instruction data is provided in a form using a mask value and a plurality of bit slice specifiers that is well suited to exploiting redundancy within groups of successive program instructions so as to achieve good rates of data compression whilst being sufficiently simple that it is suitable for a law circuit area and rapid hardware implementation.

Whilst it will be appreciated that the default bit values used under control of the bits within the mask could be fixed, preferred embodiments utilize a programmable bit value word which enables the default bit values to be adjusted to match the program being compressed, or possibly the portion of the program being compressed.

Whilst it will be appreciated that in its broadest sense the decompression could take place as a background process independently of other actions, preferred embodiments are ones in which a cache memory miss triggers a fill operation and the decompression circuit performs the required compressed instruction data decompression to form the program instructions to service that cache miss. A cache miss in this context relates to a hardware perspective in which the cache miss may be part of a committed access or the result of a speculative access performed by a prefetch unit or other mechanism.

In preferred embodiments of the invention the program accesses made by the data processing circuit to the cache memory may be made independent of the manner in which the compressed instruction data is represented. This independence allows advantages of design reuse and portability of the technique.

In order to facilitate the efficient storage of the compressed instruction data within the compressed instruction data memory, preferred embodiments utilize pointer data values which map memory addresses of program instructions being accessed by the data processing circuit to corresponding blocks of compressed instruction data within the compressed instruction data memory.

Whilst it will be appreciated that the blocks could be of a fixed length, the effectiveness of the compression is considerably improved when variable length blocks are used to accommodate the different degrees of compression that may be achieved for any given set of program instructions, and in this context the pointer values are associated with block length specifying values for the blocks concerned.

Whilst it will be appreciated that the number of program instructions associated with a mask could vary, preferred embodiments in which the byte quantised nature of memory storage is matched are ones in which 8*N program instructions are associated with each mask and N bit slice specifying bytes specify bit values for corresponding bits within respective ones of said 8*N program instructions, N being a positive non zero integer.

Whilst the data processing circuit could take a variety of different forms, such as a standard processor core, a DSP circuit and the like, in preferred embodiments the data processing circuit comprises a very long instruction word (VLIW) processor having a plurality of independently controllable data paths controlled by respective fields within the program instructions. This type of data processing circuit displays considerable redundancy within its program instructions and these tend to show bit slices within groups of program instructions which have a constant value which may accordingly be readily represented by a default value in accordance with the present techniques.

The efficiency of the decompression circuit is improved when it includes a microcache storing the pointer data values and block length specifying values.

Viewed from another aspect the present invention provides a method of processing data, said method comprising the steps of:

in response to program instructions to perform data processing operations with a data processing circuit;

storing program instructions with a cache memory coupled to said data processing circuit;

storing compressed instruction data within a compressed instruction data memory coupled to said cache memory;

receiving within an instruction decompression circuit disposed between said compressed instruction data memory and said cache memory compressed instruction data from said compressed instruction data memory;

decompressing said compressed instruction data to form program instructions; and supplying said program instructions to said cache memory, wherein said instruction decompression circuit is operable to form a plurality of said program instructions from a mask and a plurality of bit slice specifiers within said compressed instruction data, said mask having bit values specifying whether respective corresponding bit positions within each of said plurality of program instructions have a predetermined default bit value or have bit values specified by a corresponding bit slice specifier.

The above, and other objects, features and advantages of this invention will be apparent from the following detailed description of illustrative embodiments which is to be read in connection with the accompanying drawings.

DESCRIPTION OF THE PREFERRED EMBODIMENTS

Figure 1:
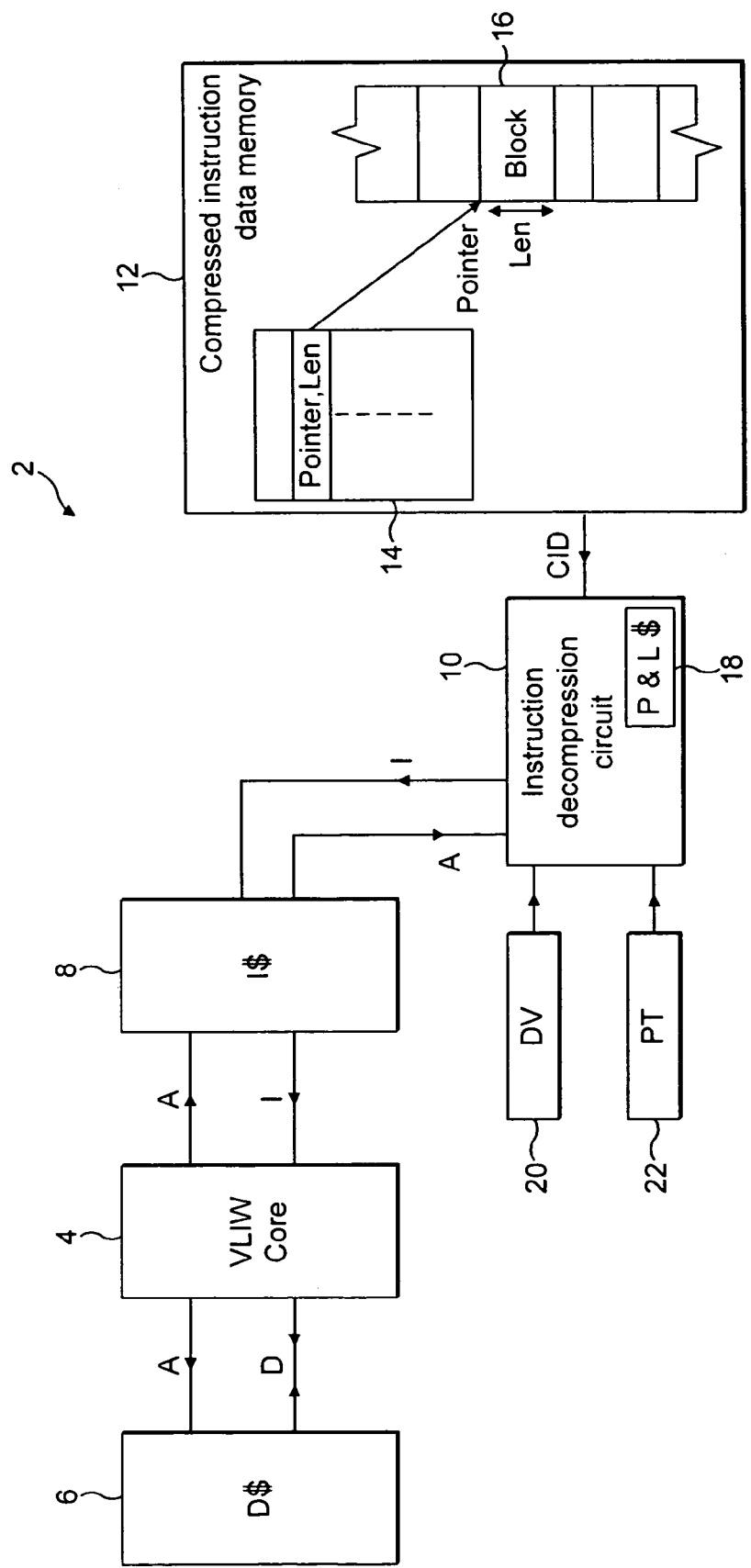
FIG. 1 schematically illustrates a data processing system utilizing instruction compression and decompression techniques.

FIG. 1 schematically illustrates a data processing apparatus 2 comprising a very long instruction word (VLIW) processor core 4 having a data cache 6 and an instruction cache 8. It will be appreciated that other embodiments using the present technique may utilize a common cache for both data and instructions if desired.

An instruction decompression circuit 10 is disposed between the instruction cache 8 and a compressed instruction data memory 12. The instruction decompression circuit 10 serves to decompress compressed instruction data read from the compressed instruction data memory 12 into program instructions I which are supplied to the instruction cache 8. A cache miss within the instruction cache 8 in response to an instruction data read request issued by the VLIW core 4 serves to trigger the instruction decompression circuit 10 to service that required cache line fill.

The memory address corresponding to the cache miss is supplied by the instruction cache 8 to the instruction decompression circuit 10 and a pointer value table 14 within the compressed instruction data memory 12 is referenced to determine a mapping between the instruction address of the miss and the address of the corresponding block of compressed instruction data 16 which includes the program instructions being sought by the VLIW processor core 4. In the illustrated example embodiment a microcache 18 within the instruction decompression circuit serves to cache recently accessed pointer values P and block length values L read from the compressed instruction data memory table 12, and more particularly from the pointer table 14. The length data L associated with each pointer value P specifies the variable length of the block 16 corresponding to that pointer value P. The length value L is used by the instruction decompression circuit 10 in combination with the pointer value P to fetch the bytes of data forming the block of compressed data 16 which it is required to decompress without requiring excess data to be recovered in a manner which would waste energy and processing resources.

Also illustrated in FIG. 1 are a default value register 20 and a pointer table register 22 which respectively store a default bit value word and a pointer to the start of the pointer table 14.

Figure 2:
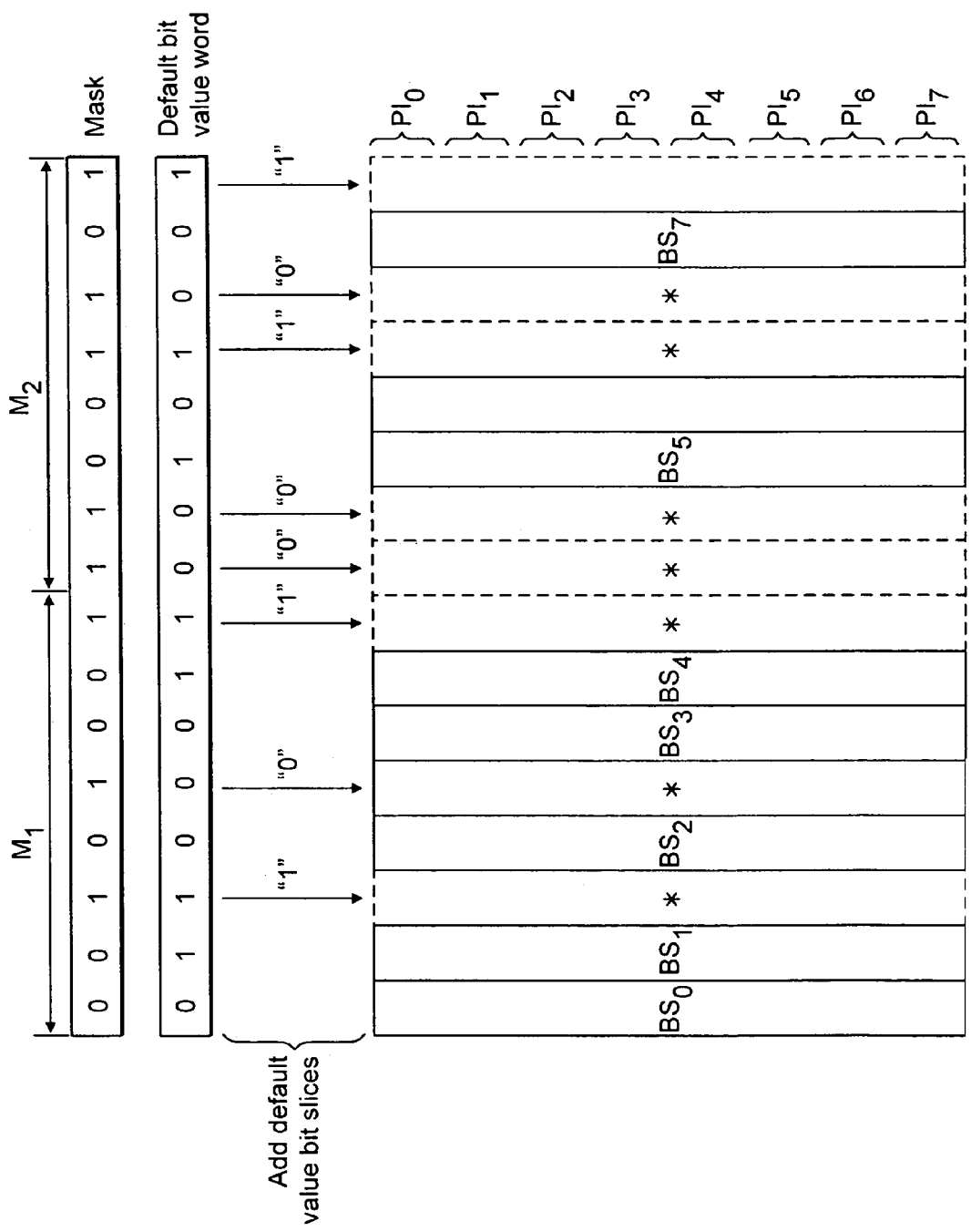
FIG. 2 schematically illustrates the use of a mask, a default bit value word and bit slice specifiers to represent a group of program instructions.

FIG. 2 schematically illustrates the compression and decompression techniques used. In this example, eight 16-bit program instructions $PI_0$ to $PI_7$ are represented (and compressed) by a 16-bit mask value and eight bit slice specifiers $BS_n$ in conjunction with a 16-bit default bit value word DV shared between a plurality of such blocks of compressed data. The mask value comprises individual bits which specify whether the corresponding bit slice within each of the eight program instructions either takes a default bit value in all the program instruction words, this default bit value being specified by a corresponding bit within the default bit value word, or contains differing bit values within the program instructions and accordingly is specified by a bit slice specifier $BS_n$.

In the example shown, the bit slices marked with a "*" use the default bit value throughout and the remaining bit slices are represented by corresponding bit slice specifiers $BS_n$.

Figure 3:
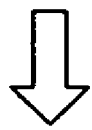
FIG. 3 illustrates a stream of bytes of compressed instruction data which corresponds to a group of program instructions in accordance with the relationship shown in FIG. 2.

FIG. 3 schematically illustrates a stream of bytes of compressed instruction data corresponding to the relationship illustrated in FIG. 2. More particularly, two mask bytes $M_1$ and $M_2$ form the 16-bit mask. These are followed by the eight required bit slice specifiers $BS_0$ to $BS_7$. In this example eight bit slices have taken a default bit value and accordingly can be omitted from compressed instruction data stream. This saving of eight bytes of data is offset by the need to supply two bytes of mask data. Nevertheless, eight 16-bit instructions are represented by ten bytes of compressed instruction data rather than 16 bytes of raw uncompressed program instructions as would otherwise be required. When the compressed instruction data is received, the mask values are read and used to insert the corresponding default bit values into the program instructions as they are being reconstituted.

The present technique exploits the recognition that among sequences of program instructions there is a significant degree of correlation within bit slices of those program instructions. This correlation can be exploited by the provision of default bit values to be used for those bit slices as indicated by corresponding bits within the mask value to achieve an overall degree of compression. This compression technique whilst effective is capable of simple embodiment within both compression and decompression hardware so as to keep the complexity and cost overhead associated with the compression and decompression technique advantageously low.

Although illustrative embodiments of the invention have been described in detail herein with reference to the accompanying drawings, it is to be understood that the invention is not limited to those precise embodiments, and that various changes and modifications can be effected therein by one skilled in the art without departing from the scope and spirit of the invention as defined by the appended claims.

We claim:

1. Apparatus for processing data, said apparatus comprising:

a data processing circuit operable in response to program instructions to perform data processing operations;

a cache memory coupled to said data processing circuit and operable to store said program instructions;

a compressed instruction data memory coupled to said cache memory; and an instruction decompression circuit disposed between said compressed instruction data memory and said cache memory and operable to receive compressed instruction data from said compressed instruction data memory, to decompress said compressed instruction data to form program instructions and to supply said program instructions to said cache memory, wherein said instruction decompression circuit is operable to form a plurality of said program instructions from a mask and a plurality of bit slice specifiers within said compressed instruction data, said mask having bit values specifying whether respective corresponding bit positions within each of said plurality of program instructions have a predetermined default bit value or have bit values specified by a corresponding bit slice specifier, and a programmable default bit value word specifies said predetermined default bit values for respective bit positions within said program instructions.

2. Apparatus as claimed in claim 1, wherein a cache miss for a program instruction within said cache memory triggers a cache program instruction fill operation in which said instruction decompression circuit decompresses compressed instruction data from said compressed instruction data memory to form one or more cache lines of data including said program instruction corresponding to said cache miss.

3. Apparatus as claimed in claim 1, wherein program instruction accesses by said data processing circuit to said cache memory are independent of how said compressed instruction data represents program instructions.

4. Apparatus as claimed in claim 1, wherein compressed instruction data includes pointer data values mapping memory addresses of program instructions accessed by said data processing circuit to corresponding blocks of compressed instruction data within said compressed instruction data memory.

5. Apparatus as claimed in claim 4, wherein said blocks of compressed instruction data have a variable length and a block length specifying value is stored in association with each pointer data value.

6. Apparatus as claimed in claim 1, wherein 8*N program instructions are associated with each mask and N bit slice specifying bytes specify bit values for corresponding bits within respective ones of said 8*N program instructions, N being a positive non zero integer.

7. Apparatus as claimed in claim 1, wherein said data processing circuit comprises a very long instruction word processor having a plurality of independently controllable data paths controlled by respective fields within said program instructions.

8. Apparatus as claimed in claim 4, wherein said instruction decompression circuit is operable to cache said pointer data values.

9. Apparatus as claimed in claim 5, wherein said instruction decompression circuit is operable to cache said block length specifying values.

10. A method of processing data, said method comprising the steps of:

in response to program instructions performing data processing operations with a data processing circuit;

storing program instructions within a cache memory coupled to said data processing circuit;

storing compressed instruction data within a compressed instruction data memory coupled to said cache memory;

receiving within an instruction decompression circuit disposed between said compressed instruction data memory and said cache memory compressed instruction data from said compressed instruction data memory;

decompressing said compressed instruction data to form program instructions; and supplying said program instructions to said cache memory, wherein said instruction decompression circuit is operable to form a plurality of said program instructions from a mask and a plurality of bit slice specifiers within said compressed instruction data, said mask having bit values specifying whether respective corresponding bit positions within each of said plurality of program instructions have a predetermined default bit value or have bit values specified by a corresponding bit slice specifier, and a programmable default bit value word specifies said predetermined default bit values for respective bit positions within said program instructions.

11. A method as claimed in claim 10, wherein a cache miss for a program instruction within said cache memory triggers a cache program instruction fill operation in which said instruction decompression circuit decompresses compressed instruction data from said compressed instruction data memory to form one or more cache lines of data including said program instruction corresponding to said cache miss.

12. A method as claimed in claim 10, wherein program instruction accesses by said data processing circuit to said cache memory are independent of how said compressed instruction data represents program instructions.

13. A method as claimed in claim 10, wherein compressed instruction data includes pointer data values mapping memory addresses of program instructions accessed by said data processing circuit to corresponding blocks of compressed instruction data within said compressed instruction data memory.

14. A method as claimed in claim 13, wherein said blocks of compressed instruction data have a variable length and a block length specifying value is stored in association with each pointer data value.

15. A method as claimed in claim 10, wherein 8*N program instructions are associated with each mask and N bit slice specifying bytes specify bit values for corresponding bits within respective ones of said 8*N program instructions, N being a positive non zero integer.

16. A method as claimed in claim 10, wherein said data processing circuit comprises a very long instruction word processor having a plurality of independently controllable data paths controlled by respective fields within said program instructions.

17. A method as claimed in claim 13, wherein said instruction decompression circuit is operable to cache said pointer data values.

18. A method as claimed in claim 14, wherein said instruction decompression circuit is operable to cache said block length specifying values.

* * * * *